United States Patent [19]

Knightley

[11] 4,355,073

[45] Oct. 19, 1982

[54] ADHESIVE COATINGS OF PREPASTED WALL COVERINGS

[75] Inventor: Jack A. Knightley, Bozeat, England

[73] Assignee: Scott Bader Company Limited, Northamptonshire, England

[21] Appl. No.: 159,105

[22] Filed: Jun. 13, 1980

[30] Foreign Application Priority Data

Jun. 26, 1979 [GB] United Kingdom ................ 7922187

[51] Int. Cl.$^3$ .............................................. C09J 7/02
[52] U.S. Cl. ...................................... 428/350; 156/71; 156/308.8; 156/331.1; 156/331.4; 427/207.1; 428/500; 428/511
[58] Field of Search .............. 427/207.1; 260/17.4 ST, 260/29.2 N, 29.6 H, 29.6 WQ; 526/303, 312, 303.1, 307.6; 428/350, 511, 500; 156/71, 308.8, 331.1, 331.4

[56] References Cited

U.S. PATENT DOCUMENTS

| | | | |
|---|---|---|---|
| 2,577,821 | 12/1951 | Smith et al. | 427/207.1 |
| 2,739,909 | 3/1956 | Rosenthal | 260/29.6 WQ |
| 2,886,557 | 5/1959 | Talet | 526/303 |
| 2,983,717 | 5/1961 | Henley et al. | 526/303 |
| 3,194,726 | 7/1965 | Baxensale | 156/331.1 |
| 3,284,393 | 11/1966 | Vanderhoff et al. | 260/29.6 H |
| 3,336,269 | 8/1967 | Monagle et al. | 526/303 |
| 3,624,019 | 11/1971 | Anderson et al. | 260/29.6 H |
| 3,929,694 | 12/1975 | Columbus | 260/17.4 ST |
| 3,957,739 | 5/1976 | Cabestany et al. | 526/303 |
| 4,052,353 | 10/1977 | Scanley | 260/29.6 WQ |
| 4,115,340 | 9/1978 | Ellwanger | 260/29.6 WQ |

FOREIGN PATENT DOCUMENTS

| | | | |
|---|---|---|---|
| 2455036 | 5/1975 | Fed. Rep. of Germany | 260/29.6 H |
| 1453951 | 10/1976 | United Kingdom | 428/511 |
| 1471283 | 4/1977 | United Kingdom . | |

*Primary Examiner*—John J. Gallagher
*Attorney, Agent, or Firm*—Omri M. Behr

[57] ABSTRACT

A prepasted wall covering has a dry coating (to be activated as the adhesive paste for the covering by immersion in water) formed from a "reverse" emulsion i.e. a water in oil emulsion of a water-soluble very high molecular weight synthetic polymer. The very low coating weight of 3–8 g/m$^2$ can be used because the water in oil emulsion has a comparatively low viscosity at high solids content.

10 Claims, No Drawings

ADHESIVE COATINGS OF PREPASTED WALL COVERINGS

This invention relates to prepasted wall coverings.

BACKGROUND OF THE INVENTION

Paper based or paper backed wall coverings are in common use and they are stuck to the wall or other substrate using an adhesive.

The adhesive can be bought as a ready made paste or as a powder which is dissolved in cold water which is then applied with a brush or roller. This method is time consuming, it is difficult to get an even coating of adhesive of the correct thickness for optimum performance and it requires a high degree of skill if the adhesive is to be prevented from staining the decorative surface.

To overcome these disadvantages manufacturers are now supplying prepasted wall coverings with the adhesive applied at a pre-determined optimum coating weight. The adhesive is activated by immersion in water until the adhesive has adsorbed sufficient water to produce the required slip and pliability.

Several types of adhesive are in common use all based on high molecular weight synthetic polymers, e.g. acrylate polymers and co-polymers, or modified natural polymers, such as carboxymethyl cellulose, dextrin and starches.

Modified starches have the major proportion of the market as they can be applied at high solids level (35-40%) and they have reasonably good slip and open (i.e., workable) time. Their disadvantage is the high coating weight (10-20 g/m$^2$) that must be applied for Vinyl wall coverings and also that such coatings are quite impermeable to air.

Carboxylated high molecular weight acrylic copolymers can be supplied as high solids (40%) and low viscosity (10 cps) emulsions. As such they can be applied to paper at low coating weights and the coated paper can be readily dried. The water insoluble polymer can be activated into an adhesive having good slip and open time by treatment with alkali so that the pH is above 7.5. The alkali can be applied from the soaking bath, but this is considered undesirable due to the lack of control over obtaining the correct pH. To overcome this problem the paper is precoated with an alkaline solution to provide the correct amount of alkali when the paper is immersed in water.

This means two carefully controlled coatings are required. Moreover, the continuity of the coherent coating provided can lead to curling of the paper under certain humidity conditions and prevents the passage of air. Continuity is also an important factor when adhesive backed papers are subsequently coated with polyvinyl chloride (PVC) plastisols because the air in the paper, if it is not able to pass through the adhesive layer comes out through or is entrapped below the PVC causing undesirable blisters.

A further method that has been employed is to electrostatically deposit dry powders, such as carboxymethyl cellulose, on to the wall covering. This technique has associated health and safety hazards and does not produce a well bonded coating. The adhesive coating weight is high and the adhesive coating is likely to dust off.

SUMMARY OF THE INVENTION

Due to the limitations of presently used products in respect of slip, covenience of use and cost, the wall covering industry still requires a coating that can be applied on existing equipment at ambient temperatures and have superior slip, open time, freedom from curl and permeability.

We have found that the application of very high molecular weight water soluble polymers in the form of water in oil emulsions overcome the disadvantages of the currently employed coatings. The molecular weights will be of the order of 500,000 or greater, preferably 1,000,000 or greater.

The required coating weights of products of the present invention are 4-5 g/m$^2$ as against 10-20 g/m$^2$ for current adhesives, measured on a dry basis.

Examples of the materials that can be used are water in oil emulsions of acrylamide homo- or co-polymers which have previously been known in general for use as flocculents in water treatment. These materials can be produced as high solids, low viscosity stable emulsions and a typical example of material is Texipol ® 63-903 (available from Scott Bader Company Limited, Wollaston, Northamptonshire, England). The high solids content may be in the range of 10 to 60% by weight and more preferably 20 to 40%, while the viscosity of the produced emulsion may lie between about 10 cps and about 30,000 cps, more preferably about 100 cps to about 1,000 cps.

Within the invention, the polymers may contain minor amounts of polyfunctional compounds to obtain lightly cross-linked material. The minor amounts may range from about 0.001% by weight to 5%. This allows lower coating weights to be used.

These emulsions can be applied by air knife or roller coating, by size press, and rotary screen.

The invention is based therefore on the realisation that by use of a water in oil emulsion desirable adhesive polymers can be coated onto a wall covering substrate, usually paper, with a very high solids content say in the range 10 to 40% while remaining at a comparatively low and therefore readily coatable viscosity, for example in the range 100 to 1,000 cps. If a solution were used, viscosities even at a 1% solid content level would be much higher than (for example) the 30,000 cps disclosed in Example 2; and if solid content were dropped so that the solution was coatable, it would be very difficult to apply sufficient polymer.

Furthermore the application of polymer from this emulsion gives a coating which is on the microscopic scale discontinuous ie. comprising discrete particles and thus will have little tendency to cause curl and will have good air permeability.

Another important aspect of the versatility of the emulsions is that they can comprise a wide range of natural and synthetic products to modify their application and adhesive characteristics.

For instance dextrins derived from the dry acid catalysed conversion of starch are cheap and readily available. They have excellent wet-tack when films are remoistened but do not have the slip and open time required of a pre-paste adhesive.

The invention includes also wall coverings coated from such emulsion, whether paper wall coverings or more particularly "Vinyl" coverings.

DESCRIPTION OF PARTICULAR EMBODIMENT

The following Examples 1 to 3 illustrate the invention.

EXAMPLE 1

A water in oil emulsion of an acrylamide/acrylic acid copolymer having a polymer content of 25% and a viscosity of 400 cps, e.g. of Texipol® 63–903, was prepared and was coated on to a wall covering base paper using a coating machine operating at 50 ft/minute and equipped with an air knife operating at 3 p.s.i. (0.22 kg/cm$^2$). After drying at 130° C. the coating weight was 5 g/m$^2$. No foaming was experienced and an even coating was obtained.

After immersion in water for 30 seconds the coated paper had good slip properties and an open time greater than 45 minutes. Excellent adhesion to emulsion painted plaster and alkyd paint surfaces was obtained.

If Texipol® TD19-32 (an acrylamide/acrylic acid copolymer cross-linked with a minor amount of triallyl isocyanurate) is emulsified in place of Texipol® 63-903 and coated, products with similar properties are obtained.

EXAMPLE 2

Texipol® 63-903 was thickened with water to yield a water in oil emulsion of 30,000 cps viscosity. This was used to coat wallpaper base by a rotary screen printing press to give 4 g/m$^2$ coating. No screen blockage was experienced.

The dried paper exhibited the same desirable properties as in Example 1 above.

EXAMPLE 3 (Preferred Example)

| Ingredients: | |
|---|---|
| Texipol® 63-903 | 100 |
| Ethylan® BCP | 1 |
| White spirit | 10 |
| 50% solids aqueous solution of White dextrin 60 | 50 |

The Ethylan BCP (a surfactant) and white spirit were added to Texipol 63-903. The white dextrin solution was emulsified into the modified Texipol 63-903 by stirring at 1500 rpm for 5 minutes. The resulting water in oil emulsion was stable and was screen printed onto wallpaper base paper to give a coating weight of 5 g/m$^2$. After drying and soaking for one minute the adhesive had an open time of 30 minutes, had excellent slip and adhesion.

In contrast with the examples above normal methods of making prepasted wall coverings do not yield such excellent properties.

EXAMPLE 4 (Comparative)

Two-coat acrylic emulsion systems rely on the alkali solubilisation of high molecular carboxylated acrylic copolymer emulsions supplied as oil in water emulsions.

Wallpaper base paper was coated with a solution of sodium carbonate of the following composition:

| Soda Ash | 110 weight units |
|---|---|
| Water | 1420 weight units |
| Sodium Carboxymethyl Cellulose | 17 weight units |
| Antifoam | 5 weight units |

This was accomplished using an air knife and dried in a hot air oven to give a coating weight of 2.5 g/m$^2$. This coating was subsequently overcoated with Texicryl® 13-300 (a 40% solids alkali soluble, acrylic copolymer oil in water emulsion) diluted to 28% solids using the same technique to give a dry coating weight of 10 g/m$^2$.

On immersion in water for 1 minute the paper only had acceptable slip and an open time of 20 minutes although adhesion to wall surfaces was good.

Not only does this technique mean coating twice, but the coating weights must be correct. Too little sodium carbonate means solubilisation does not occur to much causes the adhesive to lose "wet grab" through low viscosity.

EXAMPLE 5 (Comparative)

A proprietary blend of starches was dispersed in water to give a 25% solids solution having a viscosity of 400 cps. The solution consisted of a blend of cold water soluble starch and hot water soluble starch. The mechanism of the coating is that the cold water soluble starch disperses and holds in suspension the hot water soluble starch at coating temperature. The latter then burst and solubilise as the water in the coating enters the hot air drying zone of the coating machine.

The coating was applied by air knife to give a dry coating weight of 15 g/m$^2$. After soaking in water for 1 minute the coating had very poor slip, an open time of 15 minutes and very little adhesion. The cause of this poor performance was due to the fact that the water in the coating had either penetrated the paper or had evaporated before the bursting temperature had been reached. It was not possible on the coating machinery available to overcome this problem satisfactorily.

I claim:

1. A prepasted wall covering comprising a substrate and a dry coating, upon said substrate, said coating being activatable as an adhesive paste of said covering upon immersion in water, said coating being microscopically discontinuous and comprising particles of a water soluble synthetic polymer of molecular weight of at least 500,000, said polymeric coating having been prepared by applying to the substrate, a water-in-oil emulsion of said polymer.

2. A prepasted wall covering as claimed in claim 1 wherein the polymer is an acrylamide/acrylic acid copolymer.

3. A prepasted wall covering as claimed in claim 2 wherein the copolymer is cross-linked by a minor amount of a polyfunctional vinyl compound.

4. A prepasted wall covering as claimed in claim 1, the emulsion further comprising a dextrin.

5. A method of making a prepasted, wall covering comprising a substrate and a dry discontinuous coating of discrete particles of a very high molecular weight water-soluble polymer, said coating being activatable as an adhesive paste for said substrate upon immersion in water, comprising
   a. forming a coating on said substrate by applying to said substrate a water-in-oil emulsion of said polymer, said emulsion having a high solids content and low viscosity, and
   b. drying said coating to provide said dry coating.

6. A method as claimed in claim 5 wherein the coating weight is about 3 to about 8 g/m².

7. A coating upon a prepasted wall covering said covering comprising a substrate and a dry said coating upon said substrate, said dry coating being activatable as an adhesive paste of said covering upon immersion in water, comprising a discontinuous dry coating of discrete particles of a very high molecular weight water soluble synthetic polymer, said polymeric coating being prepared by applying to said substrate a water-in-oil emulsion of said polymer.

8. A coating in accordance with claim 7, wherein the molecular weight of the polymer is at least 1,000,000.

9. A coating in accordance with claim 7 or 8 wherein the polymer is an acrylamide containing polymer including a minor amount of at least 1 polyfunctional vinyl compound.

10. A coating in accordance with claim 7 wherein the solids content of the emulsion is at least 10% and its viscosity does not exceed 30,000 cps.

* * * * *